Feb. 13, 1968  A. J. GRANBERG  3,368,403
GENEVA MOTION LIQUID METER
Filed Feb. 7, 1966  2 Sheets-Sheet 1

INVENTOR
ALBERT J. GRANBERG
BY
Charles O. Bruce
ATTORNEY

Feb. 13, 1968  A. J. GRANBERG  3,368,403
GENEVA MOTION LIQUID METER
Filed Feb. 7, 1966  2 Sheets-Sheet 2
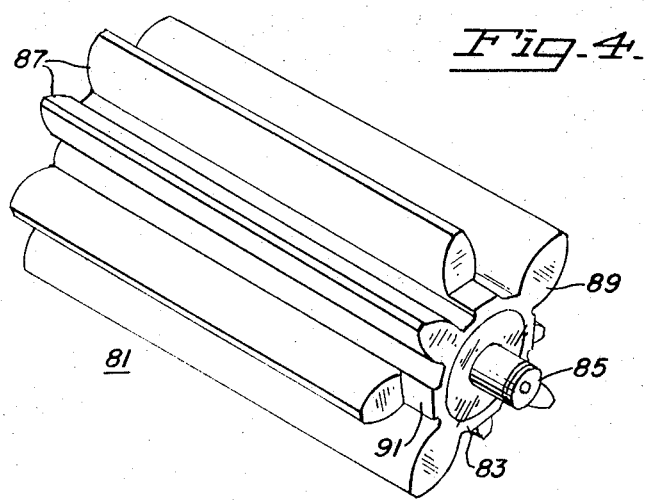
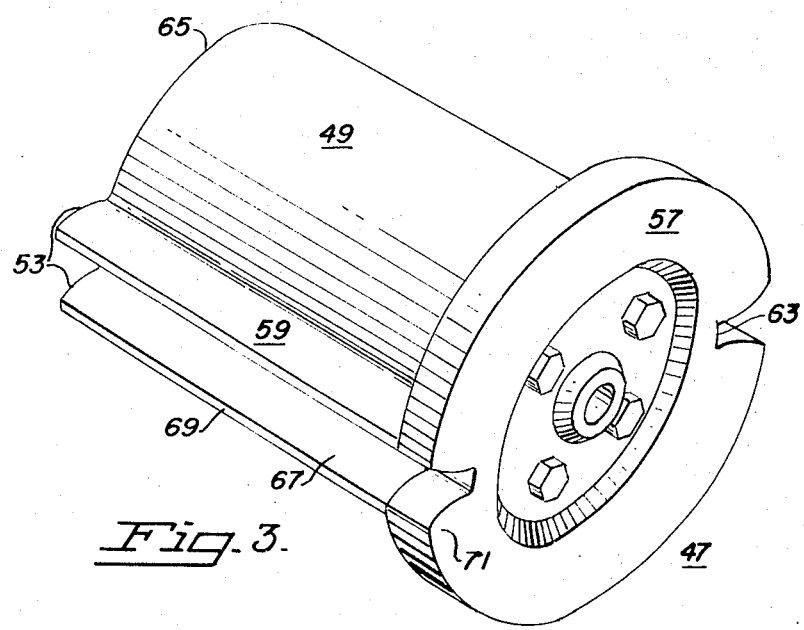
INVENTOR
ALBERT J. GRANBERG
BY
Charles O. Bruce
ATTORNEY United States Patent Office 3,368,403
Patented Feb. 13, 1968

3,368,403
GENEVA MOTION LIQUID METER
Albert J. Granberg, 6001 Rockwell St.,
Oakland, Calif. 94618
Filed Feb. 7, 1966, 525,660
16 Claims. (Cl. 73—253)

This invention relates to liquid meters. More particularly it relates to a positive displacement meter utilizing a flow driven displacement rotor driving a meshing intermittent motion elongated spur gear in a generally cylindrical meter housing.

Many types of positive displacement meters have been devised for the purpose of measuring the flow of liquid products. Generally, a vaned rotor is driven by the flow of liquid passing through the meter and a counter is in turn driven by the rotor for recording the volume of flow. The rotors have usually been quite different in each of the meters which have heretofore been used and have resulted in meters having wide ranges of accuracy and reliability.

The basic problem in devising any vaned type meter lies in providing a seal for the return side of the meter, that is, between the inlet and outlet ports. During operation, this seal must permit the rotor vanes to pass from the outlet to the inlet side of the meter while preventing liquid from flowing directly from the inlet to the outlet port. In some meter designs, the rotating vanes themselves create the seal between the ports. A meter of this type is described and illustrated in United States patent application, S.N. 454,573, filed May 10, 1965, by the present inventor, Albert J. Granberg. In other meter designs, an escapement mechanism is used to provide the seal between the ports and to permit the rotor blades or vanes to pass through it on the return side of the meter. A meter of this type is described and illustrated in the United States patent application, S.N. 492,639, filed Oct. 4, 1965, by the present inventor, Albert J. Granberg.

In order to prevent leakage of flow within the meter, and leakage between the inlet and outlet ports, two critical seals must be effected. First, the primary or counting rotor must be effectively sealed with the interior walls of the meter casing to insure that the liquid passes through the meter in a positive displacement manner and turns the counting rotor proportional to the rate of flow. Second, an escapement seal must also be provided to prevent the liquid from bypassing directly from the inlet port to the outlet port but which permits the rotor vanes or blades to pass through the seal.

In some meters, the configuration of the chamber formed between the rotor blades changes as the rotor turns thereby changing the volume of the chamber. A predetermined amount of leakage is necessary in this type of meter to prevent lockups at higher rotational speeds of the primary rotor. Unfortunately, this leakage rate is not constant over the entire speed range of operation and therefore produces inaccuracies. A meter which does not require a built in leakage rate is a necessity for accurate flow measurement. The present invention overcomes this problem and provides novel means of effecting the critical seals.

The present invention effects the solution to many problems in the art of liquid meters and provides an accurate and efficient device for measuring liquid flow. Briefly, it is a geneva motion positive displacement type meter which is comprised, in part, of a meter housing which defines an interior chamber having inlet and outlet ports disposed on generally opposite sides of the housing.

A displacement rotor having a generally cylindrical body is disposed in the chamber. The body has a multiplicity of pairs of teeth equally spaced around the periphery of the rotor and capable of sealing with the wall of the chamber between the ports. A discontinuous flange extends between nonopposing contact surfaces of the gear teeth pairs.

An escapement rotor is disposed in the chamber adjacent the displacement rotor and has an even number of teeth capable of sealing with the wall of the chamber between the inlet and outlet ports. The escapement rotor teeth are formed to mesh with the pairs of teeth on the displacement rotor, and every other one of the teeth are cutaway to receive the flange of the displacement rotor.

The two rotors intermesh whereby the escapement rotor is driven by the displacement rotor but is held from rotating by the displacement rotor flange except when passing a pair of displacement rotor teeth by an uncutaway tooth of the escapement rotor meshing between a pair of displacement rotor teeth and indexing the escapement rotor.

A liquid flow recording means is driven by the displacement rotor to record the volume of liquid flow passing through the meter housing.

Liquid under pressure enters the meter housing through the inlet port and rotates the displacement rotor by being trapped in a compartment formed between the pairs of rotor teeth, the body of the rotor, and the internal wall of the chamber. This compartment measures a determinable amount of liquid and provides the positive displacement characteristic of the meter as the liquid is incrementally passed therethrough.

It is therefore an important object of the present invention to provide a liquid flow meter which is of the positive displacement type for accurate measurement of the flow of liquid.

It is another object of the present invention to provide a liquid flow meter in which a novel escapement mechanism is utilized to seal between the inlet and outlet ports on the return side of the meter to prevent bypassage of liquid flow within the meter.

It is a further object of the present invention to provide a new and novel liquid meter for measuring volatile fluids, petroleum products, and other oils.

It is yet another object of the present invention to provide a liquid flow meter which is accurate and reliable over a large range of flow rates.

It is still a further object of the present invention to provide a liquid meter which has a minimum of parts and is easily assembled and disassembled for repair or adjustment.

Other objects and advantages of the present invention will become apparent when the flow meter is considered in conjunction with the accompanying drawings of which:

FIGURE 3 is a perspective view of the displacement rotor as used in the preferred embodiment of the present invention;

FIGURE 4 is a perspective view of the escapement rotor as used in the preferred embodiment of the present invention.

Figure 1:
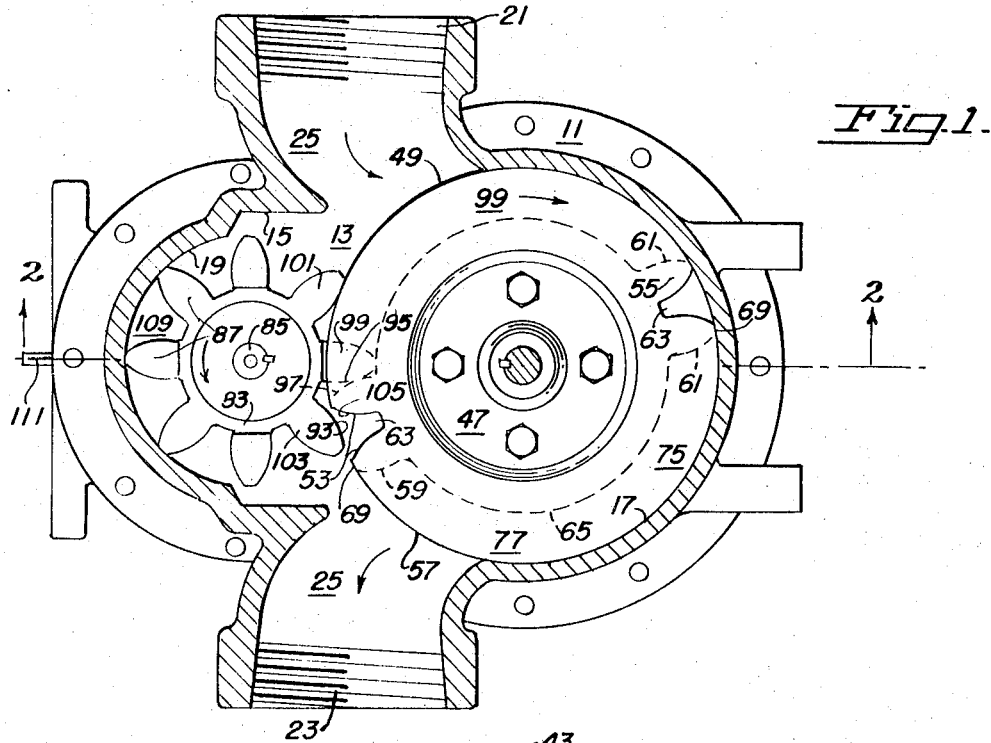
FIGURE 1 is a plan view in section of a preferred embodiment of the geneva motion positive displacement liquid flow meter of the present invention.

Reference is made to the drawings for a detailed description of the drawings. FIGURE 1 presents the basic structure and layout of the parts. The housing 11 of the meter defines an internal chamber 13 having a continuous wall 15 of opposing partially cylindrical sections 17, 19. It is basically an oblong cavity of uniform cross section which has a generally semi-circular wall section 17 of cylindrical generation of approximately, or slightly greater than, 180 degrees and an opposing semi-circular wall section 19 of cylindrical generation but of smaller diameter and equal to or less than 180 degrees of generation.

Inlet and outlet ports 21, 23 are located on generally opposite sides of the housing and communicate therethrough with the internal chamber and are disposed between the opposing cylindrical wall sections. In the preferred embodiment of the invention, the passages 25 of the ports are designed to direct the entering and egressing fluid in a streamlined path substantially tangential to the internal wall of the chamber forming the cylindrical wall section 17 of 180 degrees or more of generation.

Figure 2:
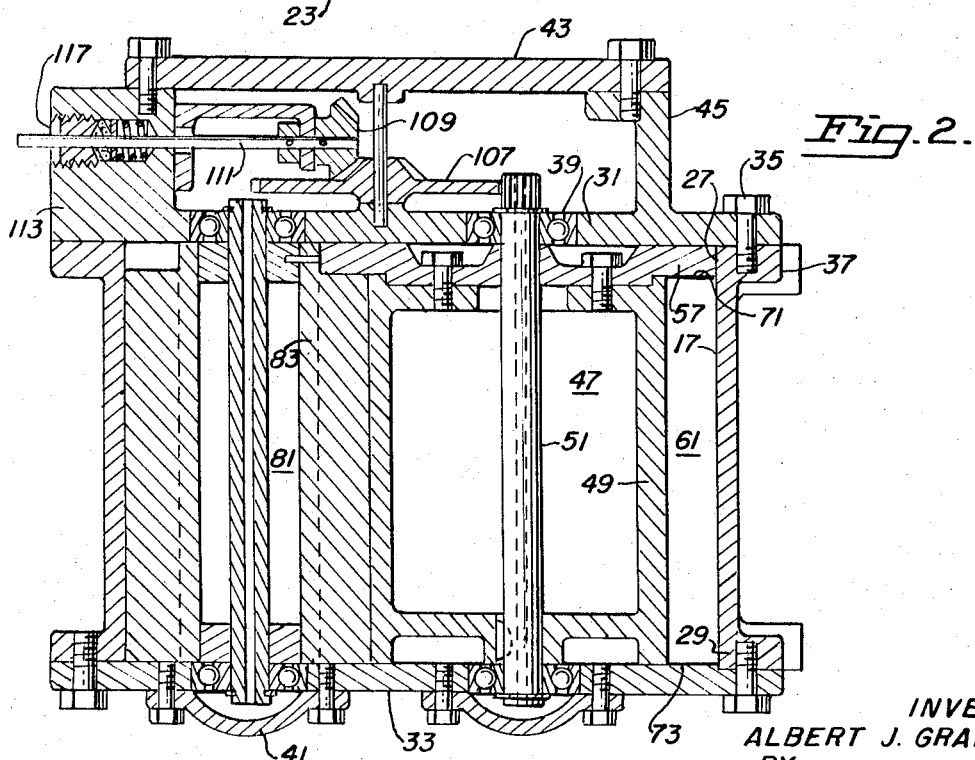
FIGURE 2 is a side elevation in section of the geneva motion liquid flow meter taken along line 2—2 of FIGURE 1.

The ends 27, 29 of the meter housing (FIGURE 2) are formed for mating with upper and lower end cover plates 31, 33. These plates are secured to the meter housing, in the preferred embodiment, by means of bolts 35 and threaded flanges 37. Other means, such as clamps, or simply nuts and bolts, work equally well. The plates can be sealed to the housing by O-rings or by other compressible liquid tight seals. The end cover plates are adapted for supporting rotating shafts by providing bearing supports and bearings 39. Lubricant for the bearings and gears is contained in the end cover plates by means of bearing caps 41 at the lower end 29 of the meter, which also hold the bearings in position, and by an upper cover 43 which secures to the retaining walls 45 of the upper end cover plate 31.

A displacement motor 47 is journalled in the end cover plates and is disposed in the chamber in concentric relation to the partially cylindrical wall section 17 of 180 degrees, or greater, of generation. That is the wall section having the fluid flow directed substantially tangential thereto. The structure of this rotor 47 is most clearly shown by the perspective view of FIGURE 3.

The displacement rotor has a generally cylindrical body 49 with a concentric hollow shaft 51 supported therein. The body is of hollow construction to reduce weight. In the preferred embodiment, two pairs of straight elongated parallel teeth 53, 55 are disposed parallel the axis of the rotor and extend substantially the length thereof. They are located at diametrically opposed positions on the cylindrical body 49. A flange 57 is located at the upper end of the body but could conceivably be located anywhere along the rotor. The flange 57 can be considered discontinuous in that it extends only between the nonopposing contact surfaces 59, 61 of the gear teeth pairs and leaves the groove 63 between each pair of teeth unrestricted for the full length thereof.

In the preferred embodiment of the invention, only two pairs of gear teeth are utilized on the body of the displacement rotor. If more than two pairs of teeth are employed, they would not need to be equally spaced around the peripheral face 65 of the body as the inherent characteristics of the mechanism will accommodate any spacing. However, for accurate measurement of small quantities of fluid flow, the pairs of teeth should be equally spaced.

The gear teeth 67 can be considered as blades or vanes. They extend radially from the rotor body 49 with the tips 69 of the blades arranged to slidably seal with the surrounding wall section 17 of the housing for at least 180 degrees of revolution between the inlet and outlet ports. Due to the rotor having two pairs of teeth, one or the other of the pairs is always sealing with the chamber wall thereby effecting a continuous seal between the inlet and outlet ports. The upper and lower edges 71, 73 of the vanes slidably seal with the upper and lower end cover plates respectively.

When the displacement rotor is situated in the meter housing, a liquid flow passage 75 is created which is defined between the cylindrical body 47 of the displacement rotor, the wall of the meter housing 17, and the end cover plates 31, 33. The liquid flow is directed from the inlet port to the outlet port through this passage. A measured compartment is formed in this passage when both pairs of the displacement rotor vanes seal the passage at both ends 77, 79.

An escapement rotor 81 having a hollow body 83, and a hollow shaft 85, is journalled in the end cover plates. This rotor is most clearly illustrated by FIGURE 4 of the drawings. The rotor is disposed in the chamber in concentric relation to the cylindrical wall section 19 opposing the wall section 17 sealing with the displacement rotor 47. The escapement rotor can be described as an elongated spur or star gear having an even number of teeth 87. The ends 89 of every other tooth are cutaway 91 for an amount of length necessary to permit the flange 57 of the displacement rotor to be received therein. The teeth 87 of the spur gear are arranged to slidably seal with the surrounding wall section 19.

When eight teeth are used on the escapement rotor, the adjacent wall section 19 must have an angle of generation equal to or in excess of 90 degrees. If less than 90 degrees of generation are used, it would be possible for one of the cutaway teeth to be located midway between the ends of the wall of generation and direct flow of fluid from inlet to the outlet port could occur through the cutaway portion 91 of the tooth. The escapement rotor effects a continuous seal between the inlet and outlet ports on the opposite side of the housing from the seal affected by the displacement rotor.

The two rotors 47, 81 intermesh whereby the escapement rotor is driven by the displacement rotor but is held from rotating by the displacement rotor flange 57 except when passing a pair of the displacement rotor teeth. This occurs by an uncutaway tooth of the escapement rotor meshing between a pair of displacement rotor teeth and indexing. This is a sequential movement and the escapement rotor rotates only intermittently. Reference is again made to FIGURE 1. For most of the revolution of the displacement rotor, the flange 57 of the displacement rotor bears against the opposing contact surfaces 93, 95 of two adjacent uncutaway teeth on the escapement rotor. As a pair of the displacement rotor blades are propelled past the outlet port, the leading face 97 of the pair contacts the cutaway tooth 99 between the two uncutaway teeth 101, 103 just held by the flange and starts the rotation of the displacement rotor. As the leading vane 105 of the displacement rotor moves the cutaway escapement rotor blade 99, an uncutaway escapement rotor blade 103 is rotated into the groove 63 between the pair of displacement rotor teeth. Thus, when the leading displacement rotor vanes 105 loses contact with the cutaway escapement rotor vane 99, the displacement rotor continues to turn the escapement rotor by virtue of the uncutaway 103 vane between the pair of displacement rotor teeth. The escapement rotor is rotated until it has indexed 90 degrees and the flange is again holding the escapement rotor from rotating. The displacement rotor continues to rotate until the next pair of displacement rotor teeth initiate the sequence again.

A liquid flow recording means (not shown) is driven by the displacement rotor. In the present embodiment of the invention, the hollow shaft 51 of the displacement rotor drives an idling gear 107 which is journalled between the end cover plate and the cover. The idling gear drives a beveled gear 109 connected to the shaft 111 of a standard mechanical counter which passes through the wall 113 of the housing by means of a packing gland 117. The counter is geared to be driven at a speed which is adjusted so as to record the volume of flow passing through the meter. This flow can be accurately determined because of the positive displacement characteristics of the meter.

In the arrangement of the working relation of the parts, in the preferred embodiment of the invention, the annular liquid flow passage 75 extends in a semi-circle of generation greater than 180 degrees. This permits both teeth of both pairs of blades to seal the passage simultaneously during a portion of each one-half revolution of the displacement rotor and intermittently lock off a measured quantity of fluid. Intermittent sealing off of all of the fluid passing through meter in a determinable volume chamber, while preventing any straight-through flow of fluid from the inlet to the outlet port, provides the positive displacement characteristic of the meter.

The teeth of both the displacement rotor and the escapement rotor seal with the end cover plates and the internal walls of the housing by having a relatively close tolerance fit with the sealing surfaces of those elements. The non-contacting relationship of the sealing surfaces permits a slidable sealing relation which effectively prevents leakage. If more than two pairs of gear teeth are provided on the displacement rotor, the passage 75 can be of a lesser angle of generation than 180 degrees, but the passage must extend around the interior wall sufficiently far to always permit at least one pair of blades to always be sealing the passage and every two pairs of blades to seal it simultaneously.

In operation, liquid enters the meter through the inlet port and is directed in a path tangential to the wall section 17 of the housing surrounding the displacement rotor. In traveling around to the outlet port, liquid impels the vanes of the displacement rotor and a measured quantity is sealed off in the passage 75 intermittently during each one-half revolution of the counting rotor and then leaves the meter through the outlet port 23. Positive displacement of liquid forward, from the inlet to the outlet port, is also effected by the escapement rotor in the compartments 109 formed by the grooves between the teeth of the rotor and the wall of the housing.

For the proportions of the meter illustrated, the escapement rotor utilizes eight gear teeth, a lesser or greater number could be used, but would destroy the size relationship effected by the selected proportions. In any event an even number of teeth should be used to permit every other tooth to always have a cutaway portion.

A separate lubricant can be contained in the structure of the upper end cover plate 31 by means of a removable cover 43 secured to side walls 45 formed on the end cover plate. The lubricant could reach the bearings in the lower bearing caps by means of the hollow shafts 51, 85 of the rotors. This would permit lubrication of the bearings on both ends of the shafts. However, in the illustrated embodiment of the invention, the necessary seals between the internal chamber and the lubricant chambers have been deleted. This is possible where the liquid being measured is a natural lubricant. If a separate lubricant were to be used, seals, such as O-rings, located between the bearings and the internal chamber on the rotating shafts, could be used to prevent the lubricant from penetrating into the meter and contaminating the liquid passing therethrough.

The rotors are constructed with a lightweight hollow design in order to provide low reciprocating weight whereby only a small amount of energy is required to drive the meter. This permits a meter which creates only a very small pressure drop when it is integrated in a liquid handling system and accurately measures low density liquids or low flow rates, or both. Thus, as a result of this, and the other advantages of this liquid meter, such as the relatively frictionless non-wearing seals between the moving parts and the chamber walls, the simple effective construction of the meter which makes it easily disassembled and re-assembled, or adjusted, a new and novel meter for the measurement of the flow of liquids is provided.

The present invention will also operate efficiently as a pump with minor alternations to the preferred embodiment device. If the flow recording means and the means for driving it are deleted and the shaft 51 of the displacement rotor 47 is extended through the cover 43 with a seal which will prevent leakage, then the shaft of the displacement rotor can be driven by any well known means and the device will operate as an efficient pump. It is particularly adaptable for use as a small capacity, high speed, high pressure, light weight pump.

It will be apparent from the foregoing description of the invention, in its preferred form, that it will fulfill all the objects attributable thereto. While it has been illustrated and described in considerable detail, the protection is not to be limited to such details as have been set forth except as many be necessitated by the appended claims.

I claim:
1. A geneva motion positive displacement liquid flow meter comprising
   a meter housing defining an interior chamber having inlet and outlet ports disposed on generally opposite sides of said housing,
   a displacement rotor having a generally cylindrical body disposed in said chamber, said body having a multiplicity of pairs of teeth equally spaced around the periphery of said rotor and capable of sealing with the wall of said chamber between said inlet and outlet ports and a discontinuous flange extending between the nonopposing contact surfaces of said gear teeth pairs.
   an escapement rotor disposed in said chamber adjacent said displacement rotor and having an even number of teeth capable of sealing with the wall of said chamber between said inlet and outlet ports and formed to mesh with the pairs of teeth on said displacement rotor, every other one of said escapement rotor teeth cutaway to receive the flange of said displacement rotor, said rotors intermeshing whereby said escapement rotor is driven by said displacement rotor but is held from rotating by said displacement rotor flange except when passing a pair of the displacement rotor teeth by an uncutaway tooth of said escapement rotor meshing between a pair of displacement rotor teeth and indexing, and
   liquid flow recording means driven by said displacement rotor.

2. The liquid flow meter of claim 1 wherein the flange of said displacement rotor is located at one end thereof and the cutaway portions of every other tooth on said escapement rotor are located on the corresponding end thereof.

3. The liquid flow meter of claim 2 wherein the teeth of said displacement rotor and said escapement rotor slidably seal with the internal wall of said chamber.

4. The liquid flow meter of claim 3 wherein the teeth of said displacement rotor and said escapement rotor are parallel the axes of said rotors and extend substantially the length thereof.

5. The liquid flow meter of claim 1 wherein the teeth of said displacement rotor and said escapement rotor slidably seal with the internal wall of said chamber.

6. The liquid flow meter of claim 1 wherein the teeth of said displacement rotor and said escapement rotor are parallel the axes of said rotors and extend substantially the length thereof.

7. A geneva motion positive displacement liquid flow meter comprising
   a meter housing defining an internal chamber, said chamber having a continuous wall of opposing partially cylindrical wall sections with inlet and outlet ports disposed on opposite sides of said housing between said opposing wall sections, said ports communicating through the wall of said housing with said chamber,
   a displacement rotor having a generally cylindrical body disposed in said chamber concentric to one of said wall sections and having two pairs of teeth at diametrically opposed positions on the peripheral face of said cylindrical body capable of slidably sealing with the surrounding wall section and a flange at one end of said body, said flange being discontinuous and extending between the nonopposing surfaces of said gear teeth pairs,
   an escapement rotor disposed in said chamber concentric the remaining wall section adjacent and meshing with said displacement rotor, said escapement rotor having an even number of equally spaced teeth capable of slidably sealing with the surrounding wall section of said chamber, every other one of said escapement rotor teeth being cutaway at one end of said rotor to receive the flange of said displacement rotor, said rotors intermeshing whereby said escapement rotor is driven by said displacement rotor but is held from rotating by said displacement rotor flange except when passing a pair of the displacement rotor teeth by an uncutaway tooth of said escapement rotor meshing between a pair of displacement rotor teeth and indexing, and liquid flow recording means driven by said displacement rotor.

8. The liquid flow meter of claim 7 including upper and lower end cover plates being sealed to said housing and having said rotors journalled therein.

9. The liquid flow meter of claim 8 wherein said rotors have hollow shafts and said end cover plates are formed for containing lubricant.

10. The liquid flow meter of claim 9 wherein the escapement rotor is an elongated spur gear having eight teeth.

11. The liquid flow meter of claim 10 wherein said rotors have hollow bodies.

12. The liquid flow meter of claim 7 wherein said rotors have hollow shafts and said end cover plates are formed for containing lubricant.

13. The liquid flow meter of claim 7 wherein said escapement rotors are elongated spur gears having eight teeth.

14. The liquid flow meter of claim 7 wherein said rotors have hollow bodies.

15. A positive displacement liquid meter comprising
a meter housing defining an internal chamber having a continuous wall of opposing partially cylindrical wall sections,
upper and lower end cover plates sealed to said housing at the ends of said chamber, said end cover plates being adapted for supporting rotating shafts and for containing lubricant therefor,
inlet and outlet ports disposed on opposite sides of said housing between said opposing wall sections and communicating therethrough with said internal chamber, said inlet and outlet ports designed to direct the flow of fluid substantially tangential to one of said cylindrical wall sections,
a displacement rotor having a hollow shaft journalled in said end cover plates and disposed in concentric relation to said wall section having the fluid flow directed substantially tangential thereto, said displacement rotor having a generally cylindrical hollow body with two pairs of teeth parallel the axis of said rotor and extending substantially the length thereof located at diametrically opposed positions on said cylindrical body, said body having a discontinuous flange at one end thereof extending between the nonopposing surfaces of said gear teeth pairs, said pairs of teeth capable of slidably sealing with the surrounding wall section,
an escapement rotor having a hollow shaft journalled in said end cover plates disposed in said chamber in concentric relation to the remaining wall section and having eight equally spaced teeth parallel the axis of said rotor and extending substantially the length thereof capable of slidably sealing with the surrounding wall section, every other one of said escapement rotor teeth being cutaway at one end of said rotor to receive the flange of said displacement rotor, said rotors intermeshing whereby said escapement rotor is driven by said displacement rotor but is held from rotating by said displacement rotor flange except when passing a pair of the displacement rotor teeth by an uncutaway tooth of said escapement rotor meshing between a pair of displacement rotor teeth and indexing,
gear transmission means supported by one of said end cover plates and driven by said displacement rotor, and
liquid flow recording means driven by said gear transmission means.

16. A geneva motion positive displacement liquid pump comprising
a housing defining an interior chamber having inlet and outlet ports disposed on generally opposite sides of said housing,
a displacement rotor having a generally cylindrical body disposed in said chamber, said body having a multiplicity of pairs of teeth equally spaced around the periphery of said rotor and capable of sealing with the wall of said chamber between said inlet and outlet ports and a discontinuous flange extending between the nonopposing contact surfaces of said gear teeth pairs,
an escapement rotor disposed in said chamber adjacent said displacement rotor and having an even number of teeth capable of sealing with the wall of said chamber between said inlet and outlet ports and formed to mesh with the pairs of teeth on said displacement rotor, every other one of said escapement rotor teeth cutaway to receive the flange of said displacement rotor, said rotors intermeshing whereby said escapement rotor is driven by said displacement rotor but is held from rotating by said displacement rotor flange except when passing a pair of the displacement rotor teeth by an uncutaway tooth of said escapement rotor meshing between a pair of displacement rotor teeth and indexing, and
power input means for rotating said displacement rotor.

References Cited

UNITED STATES PATENTS

| 313,500 | 3/1885 | Jansson | 91—86 |
| 628,566 | 7/1899 | Vay | 91—86 |
| 714,582 | 11/1902 | Johnson | 91—86 |

JAMES J. GILL, *Primary Examiner.*

R. S. SALZMAN, *Assistant Examiner.*